(12) United States Patent
Kameoka et al.

(10) Patent No.: US 12,217,755 B2
(45) Date of Patent: Feb. 4, 2025

(54) VOICE CONVERSION APPARATUS, VOICE CONVERSION LEARNING APPARATUS, IMAGE GENERATION APPARATUS, IMAGE GENERATION LEARNING APPARATUS, VOICE CONVERSION METHOD, VOICE CONVERSION LEARNING METHOD, IMAGE GENERATION METHOD, IMAGE GENERATION LEARNING METHOD, AND COMPUTER PROGRAM

(71) Applicant: Nippon Telegraph and Telephone Corporation, Tokyo (JP)

(72) Inventors: Hirokazu Kameoka, Musashino (JP); Ko Tanaka, Musashino (JP); Yasunori Oishi, Musashino (JP); Takuhiro Kaneko, Musashino (JP); Aaron Valero Puche, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 307 days.

(21) Appl. No.: 17/640,221

(22) PCT Filed: Sep. 4, 2020

(86) PCT No.: PCT/JP2020/033607
§ 371 (c)(1),
(2) Date: Mar. 3, 2022

(87) PCT Pub. No.: WO2021/045194
PCT Pub. Date: Mar. 11, 2021

(65) Prior Publication Data
US 2022/0335944 A1  Oct. 20, 2022

(30) Foreign Application Priority Data
Sep. 6, 2019 (JP) .................. 2019-163418

(51) Int. Cl.
*G10L 15/25* (2013.01)
*G06V 40/16* (2022.01)
(Continued)

(52) U.S. Cl.
CPC ............ *G10L 15/25* (2013.01); *G06V 40/176* (2022.01); *G10L 15/02* (2013.01); *G10L 15/063* (2013.01)

(58) Field of Classification Search
CPC ........ G10L 15/25; G10L 15/02; G10L 15/063
See application file for complete search history.

(56) References Cited

U.S. PATENT DOCUMENTS

| | | | |
|---|---|---|---|
| 2016/0180155 A1* | 6/2016 | Zhang | G10L 21/02 704/260 |
| 2017/0270948 A1* | 9/2017 | Li | G06T 13/40 |
| 2019/0213400 A1* | 7/2019 | Kim | G06V 10/82 |

OTHER PUBLICATIONS

Fang et al., "Audiovisual Speaker Conversion: Jointly and Simultaneously Transforming Facial Expression and Acoustic Characteristics," 2019 IEEE International Conference on Acoustics, Speech and Signal Processing (ICASSP), May 12, 2019, pp. 6795-6799, 6 pages.

(Continued)

*Primary Examiner* — Ibrahim Siddo
(74) *Attorney, Agent, or Firm* — Fish & Richardson P.C.

(57) ABSTRACT

A voice conversion device is provided with a linguistic information extraction unit that extracts linguistic information corresponding to utterance content from a conversion source voice signal, an appearance feature extraction unit that extracts appearance features expressing features related to the look of a person's face from a captured image of the person, and a converted voice generation unit that generates a converted voice on a basis of the linguistic information and the appearance features.

13 Claims, 10 Drawing Sheets

(51) Int. Cl.
    *G10L 15/02*     (2006.01)
    *G10L 15/06*     (2013.01)

(56) References Cited

OTHER PUBLICATIONS

Kameoka et al., "ACVAE-VC: Non-Parallel Voice Conversion With Auxiliary Classifier Variational Autoencoder," IEEE/ACM Transactions on Audio, Speech, and Language Processing, 2019, 27(9):1432-1443.

Kameoka et al., "Crossmodal Voice Conversion," Submitted to Interspeech 2019, dated Apr. 9, 2019, retrieved from URL <https://arxiv.org/abs/1904.04540v1>, 6 pages.

Kameoka, "Face-to-voice conversion and voice-to-face conversion," NTT Communication Science Laboratories Open House 2019, May 30, 2019, 5 pages (with English Translation).

* cited by examiner

VOICE CONVERSION APPARATUS, VOICE CONVERSION LEARNING APPARATUS, IMAGE GENERATION APPARATUS, IMAGE GENERATION LEARNING APPARATUS, VOICE CONVERSION METHOD, VOICE CONVERSION LEARNING METHOD, IMAGE GENERATION METHOD, IMAGE GENERATION LEARNING METHOD, AND COMPUTER PROGRAM

CROSS-REFERENCE TO RELATED APPLICATIONS

This application is a National Stage application under 35 U.S.C. § 371 of International Application No. PCT/JP2020/033607, having an International Filing Date of Sep. 4, 2020, which claims priority to Japanese Application Serial No. 2019-163418, filed on Sep. 6, 2019. The disclosure of the prior application is considered part of the disclosure of this application, and is incorporated in its entirety into this application.

TECHNICAL FIELD

The present invention relates to a voice conversion device, a voice conversion learning device, an image generation device, an image generation learning device, a voice conversion method, a voice conversion learning method, an image generation method, an image generation learning method, and a computer program.

BACKGROUND ART

In the related art, research into cross-modal speaker recognition and cross-modal sound generation is being investigated as an example of a cross-modal process that targets voice/sound signals and images (for example, see Non-Patent Literature 1). Cross-modal speaker recognition is the task of recognizing which of two presented face images corresponds to the speaker with respect to a given voice signal. Also, cross-modal sound generation is the task of generating a sound signal that is consistent with an event in a given image or video.

CITATION LIST

Non-Patent Literature

Non-Patent Literature 1: Hirokazu Kameoka, Takuhiro Kaneko, Kou Tanaka, Nobukatsu Hojo, "ACVAE-VC: NON-PARALLEL MANY-TO-MANY VOICE CONVERSION WITH AUXILIARY CLASSIFIER VARIATIONAL AUTOENCODER", IEEE/ACM Transactions on Audio, Speech, and Language Processing PP(99):1-1, May 2019.

SUMMARY OF THE INVENTION

Technical Problem

Meanwhile, it is generally possible to imagine to some degree what kind of face a speaking person has from an impression of their voice, or to imagine to some degree what kind of voice a person has from an impression of their face. This may be considered to suggest that some kind of correlation exists between voices and faces. However, a problem with the method of the related art is that a technique of a cross-modal process using correlations between voices and faces is not achieved.

In light of the above circumstances, an object of the present invention is to provide a technology capable of achieving a novel cross-modal process using correlations between voices and faces.

Means for Solving the Problem

One aspect of the present invention is a voice conversion device provided with a linguistic information extraction unit that extracts linguistic information corresponding to utterance content from a conversion source voice signal, an appearance feature extraction unit that extracts appearance features expressing features related to the look of a person's face from a captured image of the person, and a converted voice generation unit that generates a converted voice on a basis of the linguistic information and the appearance features.

Another aspect of the present invention is a voice conversion learning device provided with a learning unit that accepts linguistic information corresponding to utterance content extracted from a conversion source voice signal and appearance features expressing features related to the look of a person's face extracted from a captured image of the person as input, and trains parameters of a linguistic information extraction unit that extracts the linguistic information, an appearance feature extraction unit that extracts the appearance features, and a converted voice generation unit that generates a converted voice on a basis of the linguistic information and the appearance features.

According to another aspect of the present invention, in the above voice conversion learning device, the learning unit performs learning such that the converted voice obtained when the linguistic information and the appearance features are input is as close as possible to a voice signal from which the linguistic information is extracted.

Another aspect of the present invention is an image generation device provided with a timbre feature extraction unit that extracts timbre features expressing features related to vocal timbre from a voice signal, and an image generation unit that generates a face image on a basis of appearance features expressing features related to the look of a person's face obtained from a captured image of the person.

Another aspect of the present invention is an image generation learning device provided with a learning unit that accepts timbre features expressing features related to vocal timbre extracted from a voice signal, appearance features expressing features related to the look of a person's face obtained from a captured image of the person, and a captured image of a person as input, and trains parameters of an image generation unit that generates a face image on a basis of the timbre features and the appearance features and a timbre feature extraction unit that extracts the timbre features.

According to another aspect of the present invention, in the above image generation learning device, the learning unit performs learning on a basis of the appearance features and the captured image such that the face image generated when the appearance features from any given captured image are input is as close as possible to the captured image from which the appearance features are extracted.

According to another aspect of the present invention, in the above image generation learning device, the learning unit performs learning on a basis of the timbre features and the captured image such that the timbre features are as close as possible to appearance features obtained from the captured image used to generate a face image.

Another aspect of the present invention is a voice conversion method that includes extracting linguistic information corresponding to utterance content from a conversion source voice signal, extracting appearance features expressing features related to the look of a person's face from a captured image of the person, and generating a converted voice on a basis of the linguistic information and the appearance features.

Another aspect of the present invention is a voice conversion learning method including: performing learning that accepts linguistic information corresponding to utterance content extracted from a conversion source voice signal and appearance features expressing features related to the look of a person's face extracted from a captured image of the person as input, and trains parameters of a linguistic information extraction unit that extracts the linguistic information, an appearance feature extraction unit that extracts the appearance features, and a converted voice generation unit that generates a converted voice on a basis of the linguistic information and the appearance features.

Another aspect of the present invention is an image generation method that includes extracting timbre features expressing features related to vocal timbre from a voice signal, and generating a face image on a basis of the timbre features and appearance features expressing features related to the look of a person's face obtained from a captured image of the person.

Another aspect of the present invention is an image generation learning method including: performing learning that accepts timbre features expressing features related to vocal timbre extracted from a voice signal, appearance features expressing features related to the look of a person's face obtained from a captured image of the person, and a captured image of a person as input, and trains parameters of an image generation unit that generates a face image on a basis of the timbre features and the appearance features and a timbre feature extraction unit that extracts the timbre features.

Another aspect of the present invention is a computer program causing a computer to function as the above voice conversion device, voice conversion learning device, image generation device, or image generation learning device.

Effects of the Invention

According to the present invention, it is possible to achieve a novel cross-modal process using correlations between voices and faces.

DESCRIPTION OF EMBODIMENTS

Hereinafter, an embodiment of the present invention will be described with reference to the drawings.

Figure 1:
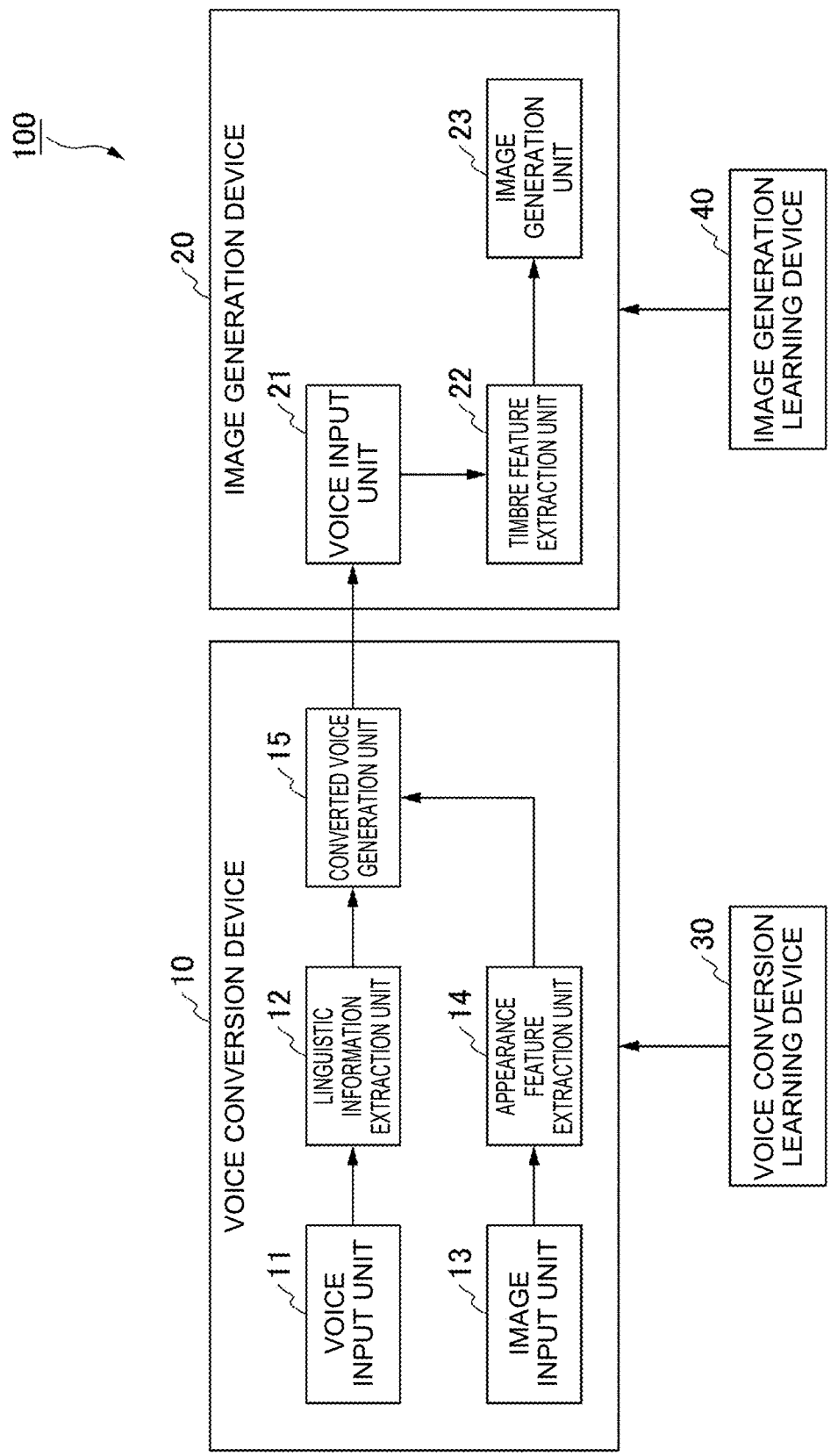
FIG. 1 is a configuration diagram illustrating a system configuration of a cross-modal processing system according to the present invention.

FIG. 1 is a diagram illustrating a system configuration of a cross-modal processing system 100 according to the present invention. The cross-modal processing system 100 is a system that uses correlations between human voices and human faces to perform a process of converting an input voice to a timbre conforming to an input face image, and also generating a face image conforming to the timbre of an input voice. The cross-modal processing system 100 is provided with a voice conversion device 10, an image generation device 20, a voice conversion learning device 30, and an image generation learning device 40.

The voice conversion device 10 is a device that converts a voice to a timbre conforming to a face image, on the basis of an input voice and a face image.

The image generation device 20 is a device that generates a face image conforming to the timbre of an input voice. The voice conversion learning device 30 is a device that trains a neural network (NN) used by the voice conversion device 10.

The image generation learning device 40 is a device that trains a NN used by the image generation device 20.

Next, a specific configuration of the voice conversion device 10, the image generation device 20, the voice conversion learning device 30, and the image generation learning device 40 will be described.

The voice conversion device 10 is provided with components such as a central processing unit (CPU), a memory, and an auxiliary storage device connected by a bus, and executes a voice conversion program. By executing the voice conversion program, the voice conversion device 10 functions as a device provided with a voice input unit 11, a linguistic information extraction unit 12, an image input unit 13, an appearance feature extraction unit 14, and a converted voice generation unit 15. Note that all or some of the functions of the voice conversion device 10 may also be achieved using hardware, such as an application-specific integrated circuit (ASIC), a programmable logic device (PLD), a field-programmable gate array (FPGA), or a graphics processing unit (GPU). In addition, the voice conversion program may also be recorded onto a computer-readable recording medium. The computer-readable recording medium refers to a portable medium such as a flexible disk, a magneto-optical disc, ROM, or a CD-ROM, or a storage device such as a hard disk built into a computer system, for example. The voice conversion program may also be transmitted and received over an electrical communication channel.

The voice input unit 11 accepts the input of a conversion source voice signal. The voice input unit 11 outputs the input conversion source voice signal to the linguistic information extraction unit 12.

The linguistic information extraction unit 12 accepts the input of the conversion source voice signal output from the voice input unit 11. The linguistic information extraction unit 12 extracts linguistic information corresponding to utterance content from the input conversion source voice signal. For example, the linguistic information extraction unit 12 is configured as a NN that accepts a conversion source voice signal as input, and extracts linguistic information corresponding to utterance content from the conversion source voice signal. The linguistic information extraction unit 12 outputs the extracted linguistic information to the converted voice generation unit 15.

The image input unit 13 accepts the input of a face image obtained by capturing a human face. The image input unit 13 outputs the input face image to the appearance feature extraction unit 14.

The appearance feature extraction unit 14 accepts the input of the face image output from the image input unit 13. The appearance feature extraction unit 14 extracts appearance features from the input face image. For example, the appearance feature extraction unit 14 is configured as a NN that accepts a face image as input, and extracts appearance features from the face image. Here, appearance features designate features related to the look of a person's face specified from a face image of the person. The appearance feature extraction unit 14 outputs the extracted appearance features to the converted voice generation unit 15.

The converted voice generation unit 15 accepts the input of linguistic information and appearance features. On the basis of the input linguistic information and appearance features, the converted voice generation unit 15 generates a converted voice. For example, the converted voice generation unit 15 is configured as a NN that accepts linguistic information and appearance features as input, and generates a converted voice. The converted voice generation unit 15 outputs the generated converted voice to the image generation device 20.

The image generation device 20 is provided with components such as a CPU, a memory, and an auxiliary storage device connected by a bus, and executes an image generation program. By executing the image generation program, the image generation device 20 functions as a device provided with a voice input unit 21, a timbre feature extraction unit 22, and an image generation unit 23. Note that all or some of the functions of the image generation device 20 may also be achieved using hardware, such as an ASIC, a PLD, an FPGA, or a GPU. In addition, the voice conversion program may also be recorded onto a computer-readable recording medium. The computer-readable recording medium refers to a portable medium such as a flexible disk, a magneto-optical disc, ROM, or a CD-ROM, or a storage device such as a hard disk built into a computer system, for example. The voice conversion program may also be transmitted and received over an electrical communication channel.

The voice input unit 21 accepts the input of a voice signal used in the generation of a face image. For example, the voice input unit 21 accepts the input of the converted voice generated by the voice conversion device 10. Note that the voice input unit 21 may also accept the input of a voice other than the converted voice generated by the voice conversion device 10. A voice other than the converted voice generated by the voice conversion device 10 may be a voice input using a voice input device such as a microphone for example, or a voice stored in advance. The voice input unit 11 outputs the input voice signal to the timbre feature extraction unit 22.

The timbre feature extraction unit 22 accepts the input of the voice signal output from the voice input unit 21. The timbre feature extraction unit 22 extracts timbre features expressing features related to vocal timbre from the input voice signal. For example, the timbre feature extraction unit 22 is configured as a NN that accepts a voice signal as input, and extracts timbre features expressing features related to vocal timbre from the input voice signal. The timbre feature extraction unit 22 outputs the extracted timbre features to the image generation unit 23.

The image generation unit 23 accepts timbre features and appearance features as input. The image generation unit 23 generates a face image on the basis of the input timbre features and appearance features. For example, the image generation unit 23 is configured as a NN that accepts timbre features and appearance features as input, and generates a face image. The image generation unit 23 outputs the generated face image to an external device. Note that the image generation unit 23 may accept the input of the appearance features extracted by the appearance feature extraction unit 14 of the voice conversion device 10, or accept appearance features input manually.

Figure 2:
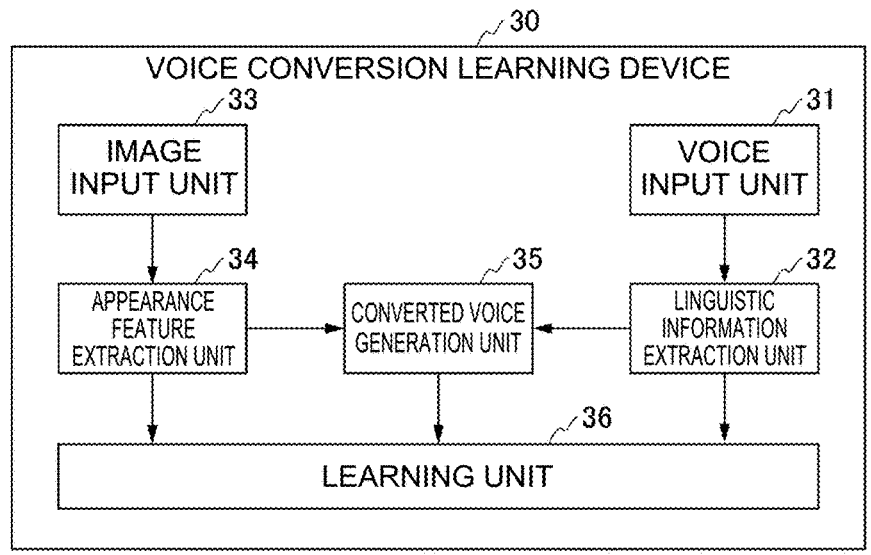
FIG. 2 is a schematic block diagram illustrating a functional configuration of a voice conversion learning device according to an embodiment.

FIG. 2 is a schematic block diagram illustrating a functional configuration of the voice conversion learning device 30 according to the embodiment.

The voice conversion learning device 30 is provided with components such as a CPU, memory, and an auxiliary storage device connected by a bus, and executes a learning program. By executing the learning program, the voice conversion learning device 30 functions as a device provided with a voice input unit 31, a linguistic information extraction unit 32, an image input unit 33, an appearance feature extraction unit 34, a converted voice generation unit 35, and a learning unit 36. Note that all or some of the functions of the voice conversion learning device 30 may also be achieved using hardware, such as an ASIC, a PLD, an FPGA, or a GPU. In addition, the learning program may also be recorded onto a computer-readable recording medium. The computer-readable recording medium refers to a portable medium such as a flexible disk, a magneto-optical disc, ROM, or a CD-ROM, or a storage device such as a hard disk built into a computer system, for example. The learning program may also be transmitted and received over an electrical communication channel.

The voice input unit 31 accepts the input of a conversion source voice signal. The voice input unit 31 outputs the input conversion source voice signal to the linguistic information extraction unit 32.

The linguistic information extraction unit 32 accepts the input of the conversion source voice signal output from the voice input unit 31. The linguistic information extraction unit 32 extracts linguistic information corresponding to utterance content from the input conversion source voice signal. For example, the linguistic information extraction unit 32 is configured as a NN that accepts a conversion source voice signal as input, and extracts linguistic information corresponding to utterance content from the conversion source voice signal. The linguistic information extraction unit 32 outputs the extracted linguistic information to the converted voice generation unit 35 and the learning unit 36.

The image input unit 33 accepts the input of a face image obtained by capturing a human face. The image input unit 33 outputs the input face image to the appearance feature extraction unit 34.

The appearance feature extraction unit 34 accepts the input of the face image output from the image input unit 33. The appearance feature extraction unit 34 extracts appearance features from the input face image. For example, the appearance feature extraction unit 34 is configured as a NN that accepts a face image as input, and extracts appearance features from the face image. The appearance feature extraction unit 34 outputs the extracted appearance features to the converted voice generation unit 35 and the learning unit 36.

The converted voice generation unit 35 accepts the input of linguistic information and appearance features. The converted voice generation unit 35 generates a converted voice on the basis of the input linguistic information and the appearance features. For example, the converted voice generation unit 35 is configured as a NN that accepts linguistic information and appearance features as input, and generates a converted voice. The converted voice generation unit 35 outputs the generated converted voice to the learning unit 36.

The learning unit 36 accepts the input of linguistic information, appearance features, and a converted voice. The learning unit 36 performs learning on the basis of the input linguistic information, appearance features, and converted voice such that when linguistic information z (=SpeechEnc (x)) as the output of the linguistic information extraction unit 32 and appearance features c (=FaceEnc(y)) as the output of the appearance feature extraction unit 34 are input into the converted voice generation unit 35, the output converted voice ^x (where ^ is written above x)=SpeechDec(SpeechEnc(x); FaceEnc(y)) is as close as possible to the voice signal x input into the linguistic information extraction unit 32. This is because, in the case where the speaker of the voice signal x and the person of the face image y from the appearance features c originate are the same person, it is desirable for the linguistic information extraction unit 32 and the converted voice generation unit 35 to reconstruct the input voice as-is. On the basis of the learning result, the learning unit 36 updates parameters of the linguistic information extraction unit 12, the appearance feature extraction unit 14, and the converted voice generation unit 15 of the voice conversion device 10.

Figure 3:
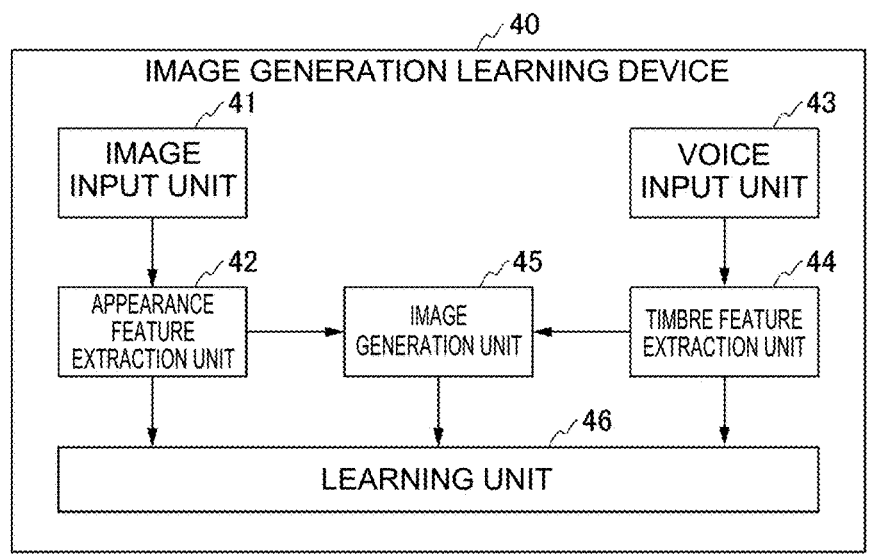
FIG. 3 is a schematic block diagram illustrating a functional configuration of an image generation learning device according to the embodiment.

FIG. 3 is a schematic block diagram illustrating a functional configuration of the image generation learning device 40 according to the embodiment.

The image generation learning device 40 is provided with components such as a CPU, memory, and an auxiliary storage device connected by a bus, and executes a learning program. By executing the learning program, the image generation learning device 40 functions as a device provided with an image input unit 41, an appearance feature extraction unit 42, a voice input unit 43, a timbre feature extraction unit 44, an image generation unit 45, and a learning unit 46.

Note that all or some of the functions of the voice conversion learning device 30 may also be achieved using hardware, such as an ASIC, a PLD, an FPGA, or a GPU. In addition, the learning program may also be recorded onto a computer-readable recording medium. The computer-readable recording medium refers to a portable medium such as a flexible disk, a magneto-optical disc, ROM, or a CD-ROM, or a storage device such as a hard disk built into a computer system, for example. The learning program may also be transmitted and received over an electrical communication channel.

The image input unit 41 accepts the input of a face image obtained by capturing a human face. The image input unit 41 outputs the input face image to the appearance feature extraction unit 42.

The appearance feature extraction unit 42 accepts the input of the face image output from the image input unit 41. The appearance feature extraction unit 42 extracts appearance features from the input face image. For example, the appearance feature extraction unit 42 is configured as a NN that accepts a face image as input, and extracts appearance features from the face image. The appearance feature extraction unit 42 outputs the extracted appearance features to the image generation unit 45 and the learning unit 46.

The voice input unit 43 accepts the input of a voice signal used in the generation of a face image. For example, the voice input unit 43 accepts the input of the converted voice generated by the voice conversion device 10. The voice input unit 43 outputs the input voice signal to the timbre feature extraction unit 44.

The timbre feature extraction unit 44 accepts the input of the voice signal output from the voice input unit 43. The timbre feature extraction unit 44 extracts timbre features expressing features related to vocal timbre from the input voice signal. For example, the timbre feature extraction unit 44 is configured as a NN that accepts a voice signal as input, and extracts timbre features expressing features related to vocal timbre from the input voice signal. The timbre feature extraction unit 44 outputs the extracted timbre features to the image generation unit 45 and the learning unit 46.

The image generation unit 45 accepts timbre features and appearance features as input. The image generation unit 45 generates a face image on the basis of the input timbre features and appearance features. For example, the image generation unit 45 is configured as a NN that accepts timbre features and appearance features as input, and generates a face image. The image generation unit 45 outputs the generated face image to the learning unit 46.

The learning unit 46 accepts the input of appearance features, timbre features, and a face image. The learning unit 46 performs learning on the basis of the input appearance features and face image such that for any given face image y, when the appearance features c=FaceEnc(y) as the output of the appearance feature extraction unit 42 are input into the image generation unit 45, the output face image ^y (where ^ is written above y)=FaceDec(FaceEnc(y)) is as close as possible to the face image y input into the appearance feature extraction unit 42. This is because it is desirable for the appearance features extracted by the appearance feature extraction unit 42 to retain as much information from the original face image as possible. On the basis of the learning result, the learning unit 46 updates parameters of the image generation unit 23 of the image generation device 20.

Additionally, the learning unit 46 performs learning on the basis of the input timbre features and face image such that when the converted voice ^x (where ^ is written above x)=SpeechDec(z, c) as the output of a converted voice generation unit is input into the timbre feature extraction unit 44, the output timbre features ^c (where ^ is written above c)=VoiceEnc(SpeechDec(z, c)) is as close as possible to the appearance features c used as the input into the converted voice generation unit. This is because it is desirable for the voice output by the converted voice generation unit to be influenced by the appearance features as strongly as possible. On the basis of the learning result, the learning unit 46 updates parameters of the timbre feature extraction unit 22 of the image generation device 20.

Principle of Embodiment According to Present Invention

<Variational Autoencoder (VAE)>

A VAE is a probabilistic generative model containing encoder and decoder neural networks (NNs). In an ordinary autoencoder (AE), the encoder is a NN for the purpose of compressing input data x into a latent variable z of lower dimensionality, and the decoder is a NN for the purpose of restoring the data x from the latent variable z. In a VAE, the decoder is modeled as a NN that outputs probability distribution parameters (in the case of a Gaussian distribution, the mean and the variance) of a conditional distribution $p_\theta(x|z)$ of the data x. Here, $\theta$ represents the parameters of the NN. The encoder corresponding to the above should produce a posterior distribution expressed as in the following Expression (1), but obtaining the posterior distribution analytically is difficult.

[Math. 1]

$$p(z|x) = \frac{p_\theta(x|z)p(z)}{\int p_\theta(x|z)p(z)dz} \quad \text{Expression (1)}$$

Accordingly, an auxiliary distribution $q_\varphi(z|x)$ for the purpose of approximating the posterior distribution $p(z|x)$ is newly introduced, and the goal of the VAE is to obtain an auxiliary distribution $q_\varphi(z|x)$ and a conditional distribution $p_\theta(x|z)$ such that the auxiliary distribution $q_\varphi(z|x)$ and the true posterior distribution are as close as possible. The Kullback-Leibler (KL) divergence between the auxiliary distribution $q_\varphi(z|x)$ and the posterior distribution $p(z|x)$ is expressed as in the following Expression (2).

[Math. 2]

$$KL[q_\varphi(z|x)\|p_\theta(z|x)] = \log p(x) - \mathbb{E}_{z \sim q_\varphi(z|x)}[\log p_\theta(x|z)] + KL[q_\varphi(z|x)\|p(z)] \quad \text{Expression (2)}$$

If the unknown parameters $\theta$, $\varphi$ could be obtained so as to increase $\mathbb{E}_{z \sim q_\varphi(z|x)}[\log p_\theta(x|z)] - KL[q_\varphi(z|x)\|p(z)]$, an encoder and a decoder that are consistent with each other could be obtained. Here, as an example, suppose that $\mu_\varphi(x)$, $\log \sigma^2_\varphi(x)$ are the output of an encoder NN with the parameter $\varphi$, $\mu_\theta(z)$, $\log \sigma^2_\theta(z)$ are the output of a decoder NN with the parameter $\theta$, and $q(z|x)$ and $p(x|z)$ are each Gaussian distributions having a mean and a variance. Also, let $p(z)$ be the standard Gaussian distribution. At this point, assumptions are made as in the following Expressions (3) to (5).

[Math. 3]

$$q_\varphi(z|x) = \mathcal{N}(z|\mu_\varphi(x), \text{diag}(\sigma_\varphi^2(x))) \quad \text{Expression (3)}$$

[Math. 4]

$$p_\theta(x|z) = \mathcal{N}(x|\mu_\theta(z), \text{diag}(\sigma_\theta^2(z))) \quad \text{Expression (4)}$$

[Math. 5]

$$p(z) = \mathcal{N}(z|0, I) \quad \text{Expression (5)}$$

If assumptions are made as in the above Expressions (3) to (5), the second term of Expression (2) represents an index expressing the reconstruction error of the input x by the encoder and the decoder, while the third term of Expression (2) is an index expressing the divergence between the distribution of the output z of the encoder and the standard Gaussian distribution $p(z)$. Consequently, decreasing Expression (2) means obtaining an autoencoder in which the elements of the latent variable z are as uncorrelated as possible. Note that the KL divergence is a non-negative value. Consequently, the criterion $\mathbb{E}_{z \sim q_\varphi(z|x)}[\log p_\theta(x|z)] - KL[q_\varphi(z|x)\|p(z)]$ described above is the lower bound of the logarithmic marginal likelihood $\log p(x)$. From the above, the learning criterion that should be maximized when given a learning sample $x \sim p(x)$ is expressed as in the following Expression (6).

[Math. 6]

$$\mathcal{J}(\varphi, \theta) = \mathbb{E}_{x \sim p(x)}[\mathbb{E}_{z \sim q_\varphi(z|x)}[\log p_\theta(x|z)] - KL[q_\varphi(z|x)\|p(z)]] \quad \text{Expression (6)}$$

In Expression (6), $\mathbb{E}_{x \sim p(x)}[\bullet]$ means the sample mean of all data samples. A conditional VAE (CVAE) is an extension of the VAE in a form such that an auxiliary variable c is inputtable into the encoder and the decoder as in the following Expressions (7) and (8).

[Math. 7]

$$q_\varphi(z|x, c) = \mathcal{N}(z|\mu_\varphi(x, c), \text{diag}(\sigma^2_\varphi(x, c))) \quad \text{Expression (7)}$$

[Math. 8]

$$p_\theta(x|z, c) = \mathcal{N}(x|\mu_\theta(z, c), \text{diag}(\sigma_\theta^2(z, c))) \quad \text{Expression (8)}$$

At this point, the learning criterion that should be maximized when given a learning sample $(x, c) \sim p(x, c)$ is expressed as in the following Expression (9).

[Math. 9]

$$\mathcal{J}(\varphi, \theta) = \mathbb{E}_{c \sim p(c), x \sim p_\theta(x|c)}[\mathbb{E}_{z \sim q_\varphi(z|x, c)}[\log p_\theta(x|z, c)] - KL[q_\varphi(z|x, c)\|p(z)]] \quad \text{Expression (9)}$$

In Expression (9), $\mathbb{E}_{c \sim p(c), x \sim p_\theta(x|c)}[\bullet]$ means the sample mean of all data samples for every attribute.

Timbre conversion by CVAE (conventional method)

[Math. 10]

$$x \in \mathbb{R}^{D \times N} \quad \text{Expression (10)}$$

Provided that the above Expression (10) is a vector series of acoustic features (for example, mel-frequency cepstral coefficients) in units of utterances and c is an attribute code, the problem of timbre conversion to the attribute c can be formulated by the CVAE. Provided that attribute-labeled learning data is $\{x_m, c_m\}^M_{m=1}$, the encoder is trained as a function that uses the attribute code $c_n$ as a cue to convert an acoustic feature $x_n$ to a latent variable $z_n$, while the decoder is trained as a function that uses the attribute code $c_n$ as a cue to reconstruct an acoustic feature $\hat{x}_n$ (where ^ is written above x) from the latent variable $z_n$. After learning is completed, by inputting an acoustic feature series of a voice to be converted into the encoder and then inputting the generated latent variable together with a target attribute code into the decoder to reconstruct the acoustic feature series, an acoustic feature series having the target attribute can be obtained. Thereafter, the above result is converting into a time-domain signal to obtain a converted voice.

Hereinafter, details of the present invention using the VAE and CVAE illustrated above will be described.

An acoustic feature series x of the voice of a certain speaker and a face image y of the speaker are expressed by the following Expressions (11) and (12), respectively.

[Math. 11]

$$x = [x_1 \ldots x_N] \in \mathbb{R}^{D \times N} \qquad \text{Expression (11)}$$

[Math. 12]

$$y \in \mathbb{R}^{I \times J} \qquad \text{Expression (12)}$$

In Expression (11), D represents the dimensionality of the acoustic feature vector, and N represents the length of the acoustic feature series. Also, in Expression (12), I and J represent the image size. At this point, consider a CVAE that generates the acoustic feature series x and a VAE that generates the face image y. Consider using the VAE and the CVAE to model a joint distribution p(x, y) of the acoustic feature series x and the face image y. The encoder of the acoustic feature series x takes a role of extracting a latent variable series z from an acoustic feature series of an input voice. The decoder of the acoustic feature series x takes a role of reconstructing an acoustic feature series on the basis of the latent variable series z and the auxiliary variable c. If the latent variable series z may be considered to correspond to linguistic information, the encoder may be considered to be the linguistic information extraction unit 12 and the decoder may be considered to be (the acoustic model of) the converted voice generation unit 15. In this case, it is desirable for the auxiliary variable c to include information corresponding to the target timbre.

On the other hand, the encoder of the face image y takes the role of the appearance feature extraction unit 14 that extracts appearance features from an input face image. The decoder of the face image y may be considered to be the image generation unit 23 that reconstructs a face image from appearance features. Accordingly, the latent variable extracted by the appearance feature extraction unit 14 such that information corresponding to the target timbre in the converted voice generation unit 15 is determined by the face image y may be considered to be the auxiliary input c of the converted voice generation unit 15. In addition, to keep the influence of the auxiliary input c from being lost in the process of decoding the acoustic feature series x, it is conceivable to introduce an encoder that takes a role of reconstructing the auxiliary input c from the output of the decoder of the acoustic feature series x. The encoder is considered to be the timbre feature extraction unit 22 that retrieves information related to a timbre consistent with the appearance features of an input image from an input voice. The above is the basic approach of the method according to the present invention.

Hereinafter, the basic approach above will be formulated specifically. The converted voice generation unit 15 and the image generation unit 23 are NNs that output parameters of conditional distributions $p_{\theta_{aud}}(x|z,c)$ and $p_{\theta_{vis}}(y|c)$, respectively. Here, in the converted voice generation unit 15 and the image generation unit 23, aud and vis are subscripts of θ. Also, the linguistic information extraction unit 12 and the appearance feature extraction unit 14 are NNs that output parameters of conditional distributions $q_{\varphi_{aud}}(z|x)$ and $q_{\varphi_{vis}}(c|y)$ respectively. Here, in the linguistic information extraction unit 12 and the appearance feature extraction unit 14, aud and vis are subscripts of φ. The terms $\theta_{aud}$, $\theta_{vis}$, $\varphi_{aud}$, and $\varphi_{vis}$ represent the parameters of each NN.

Here, the learning goal is to approximate the true posterior distribution of z, c derived from $p_{\theta_{aud}}(x|z,c)$ and $p_{\theta_{vis}}(y|c)$ using $q(z, c|x, y) = q_{\varphi_{aud}}(z|x) q_{\varphi_{vis}}(c|y)$. Note that the true posterior distribution of z, c is expressed as in the following Expression (13).

[Math. 13]

$$p(z, c|x, y) \propto p_{\theta_{aud}}(x|z, c) p_{\theta_{vis}}(y|c) \qquad \text{Expression (13)}$$

The KL divergence between p(z, c|x, y) and q(z, cx, y) is expressed as in the following Expression (14).

[Math. 14]

$$KL[q(z, c|x, y) \| p(z, c|x, y)] = \qquad \text{Expression (14)}$$
$$\log p(x, y) - \mathbb{E}_{c \sim q_{\phi_{vis}}(c|y), z \sim q_{\phi_{aud}}(z|x)}[\log p_{\theta_{aud}}(x|z, c)]$$
$$- \mathbb{E}_{c \sim q_{\phi_{vis}}(c|y)}[\log p_{\theta_{vis}}(y|c)] + KL[q_{\phi_{aud}}(z|x) \| p(z)]$$
$$+ KL[q_{\phi_{vis}}(c|y) \| p(c)]$$

Given a learning sample (x, y)~pd(x, y), the learning criterion is expressed as in the following Expression (15).

[Math. 15]

$$\mathcal{J}(\theta_{aud}, \phi_{aud}, \theta_{vis}, \phi_{vis}) = \qquad \text{Expression (15)}$$
$$\mathbb{E}_{(x,y) \sim p_d(x,y)} \mathbb{E}_{c \sim q_{\phi_{vis}}(c|y), z \sim q_{\phi_{aud}}(z|x)}[\log p_{\theta_{aud}}(x|z, c)]$$
$$+ E_{y \sim p_d(y)} \mathbb{E}_{c \sim q_{\phi_{vis}}(c|y)}[\log p_{\theta_{vis}}(y|c) - E_{x \sim p_d(x)}$$
$$KL[q_{\phi_{aud}}(z|x) \| p(z)] - E_{y \sim p_d(y)} KL[q_{\phi_{vis}}(c|y) \| p(c)]$$

At this point, as an example, $\mu_{\varphi_{aud}}(x)$ and $\log \sigma^2_{\varphi_{aud}}(x)$ are the output of the NN of the linguistic information extraction unit 12 with the parameter $\varphi_{aud}$, $\mu_{\theta_{aud}}(z, c)$ and $\log \sigma^2_{\theta_{aud}}(z, c)$ are the output of the NN of the converted voice generation unit 15 with the parameter $\theta_{aud}$, $\mu_{\varphi_{vis}}(y)$ and $\log \sigma^2_{\varphi_{vis}}(y)$ are the output of the NN of the appearance feature extraction unit 14 with the parameter $\varphi_{vis}$, $\mu_{\theta_{vis}}(c)$ and $\log \sigma^2_{\theta_{vis}}(c)$ are the output of the NN of the image generation unit 23 with the parameter $\theta_{vis}$, and $q_{\varphi_{aud}}(z|x)$, $p_{\theta_{aud}}(x|z, c)$, $q_{\varphi_{vis}}(c|y)$, and $p_{\theta_{vis}}(y|c)$ are each Gaussian distributions having a mean and a variance. Also, let p(z) and p(c) be standard Gaussian distributions. At this point, assumptions are made as in the following Expressions (16) to (21).

[Math. 16]

$$q_{\phi_{aud}}(z|x) = \mathcal{N}(z|\mu_{\phi_{aud}}(x), \text{diag}(\sigma_{\phi_{aud}}^2(x))) \qquad \text{Expression (16)}$$

[Math. 17]

$$p_{\theta_{aud}}(x|z,c) = \mathcal{N}(x|\mu_{\theta_{aud}}(z,c), \text{diag}(\sigma_{\theta_{aud}}^2)) \qquad \text{Expression (17)}$$

[Math. 18]

$$q_{\phi_{vis}}(c|y) = \mathcal{N}(c|\mu_{\phi_{vis}}(y), \text{diag}(\sigma_{\phi_{vis}}^2(y))) \qquad \text{Expression (18)}$$

[Math. 19]

$$p_{\theta_{vis}}(y|c) = \mathcal{N}(y|\mu_{\theta_{vis}}(c), \text{diag}(\sigma_{\theta_{vis}}^2(c))) \qquad \text{Expression (19)}$$

[Math. 20]

$$p(z) = \mathcal{N}(z|0, I) \quad \text{Expression (20)}$$

[Math. 21]

$$p(c) = \mathcal{N}(c|0, I) \quad \text{Expression (21)}$$

If assumptions are made as in the above Expression (16) to (21), the first term of Expression (15) represents an index expressing the reconstruction error of the input x by the linguistic information extraction unit 12 and the converted voice generation unit 15 (a weighted square error between x and $\mu_{\theta_{aud}}(z, c)$), the second term of Expression (15) represents an index expressing the reconstruction error of the input y by the appearance feature extraction unit 14 and the image generation unit 23 (a weighted square error between y and $\mu\theta_{vis}(c)$), and the third and fourth terms of Expression (15) represent indices expressing the divergence from the standard Gaussian distributions of $q_{\varphi_{aud}}(z|x)$ and $q_{\varphi_{vis}}(c|y)$.

Meanwhile, in the model described above, depending on the functional complexity and expressive ability of the linguistic information extraction unit 12 and the converted voice generation unit 15, the possibility that $p_{\theta_{aud}}(x|z, c)$ might be trained independently of the auxiliary input c cannot be ruled out. For example, the case where the conversion process with respect to the input x by the linguistic information extraction unit 12 and the converted voice generation unit 15 results in an identity mapping is easy to understand. In this case, the model is capable of expressing any given input x without relying on the auxiliary variable c. Consequently, the resulting situation is one in which $p_{\theta_{aud}}(x|z, c)$ becomes $p_{\theta_{aud}}(x|z, c) = p_{\theta_{aud}}(x|z)$, independent of the auxiliary variable c. With a model trained in this way, the input voice is generated from the converted voice generation unit 15 as-is without being influenced by the auxiliary variable c, and the conversion effect is undesirable. To avoid a situation like the above, it is conceivable to adopt a learning method that accounts for mutual information between the auxiliary variable c and the output of the converted voice generation unit 15 so that the influence of the auxiliary variable c on the converted voice generation unit 15 is not lost. Mutual information is expressed as in the following Expression (22).

[Math. 22]

$$\ell(\theta_{aud}) = \int\int p(c', x) \log\frac{p(c', x)}{p(c')p(x)} dx dc' \quad \text{Expression (22)}$$

$$= \int\int p(x)p(c'|x) \log p(c'|x) dx dc' + H$$

$$= \mathbb{E}_{x \sim p_{\theta_{aud}}(x|z,c), c' \sim p(c|x)}[\log p(c'|x)] + H$$

In Expression (22), H represents the entropy of the auxiliary variable c, which is treated as a constant herein. Although the mutual information can be written in a form that includes the posterior distribution p(c|x) of the auxiliary variable c as in Expression (22), describing this distribution analytically is difficult. For this reason, learning each NN to increase Expression (22) directly is difficult. Accordingly, an auxiliary distribution r(c|x) is introduced for the purpose of approximating the true posterior distribution p(c|x), and a lower bound of the first term of Expression (22) is given using the auxiliary distribution r(c|x) as in the following Expression (23).

[Math. 23]

$$\mathbb{E}_{x \sim p_{\theta_{aud}}(x|z,c), c' \sim p(cx)}[\log p(c'|x)] = \mathbb{E}_{x \sim p_{\theta_{aud}}(x|z,c), c' \sim p(c|x)}\left[\log\frac{r(c'|x)p(c'|x)}{r(c'|x)}\right] \quad \text{Expression (23)}$$

$$\geq \mathbb{E}_{x \sim p_{\theta_{aud}}(x|z,c), c' \sim p(c|x)}[\log r(c'|x)]$$

$$= \mathbb{E}_{x \sim p_{\theta_{aud}}(x|z,c)}[\log r(c|x)]$$

The sign of the inequality holds when r(c|x)=p(c|x). Consequently, treating r(c|x) as an argument function and increasing the right side with respect to r(c|x) corresponds to approximating p(c|x) with r(c|x) and also approximating the mutual information with the right side. Therefore, by increasing $q_{\varphi_{aud}}(z|x)$, $p_{\theta_{aud}}(x|z, c)$, $q_{\varphi_{vis}}(c|y)$ and $p_{\theta_{vis}}(y|c)$ as well as the right side of Expression (23) with respect to the auxiliary distribution r(c|x), the mutual information can be increased indirectly. The auxiliary distribution r(c|x) expresses the appearance features or timbre features of the speaker of x, and therefore may be considered to be the timbre feature extraction unit 22. In the present embodiment, the distribution parameter of the auxiliary distribution r(c|x) is expressed by a NN, and the parameter $\psi$ is trained together with $\theta_{aud}$, $\varphi_{aud}$, $\theta_{vis}$, and $\varphi_{vis}$. Hereinafter, the auxiliary distribution r(c|x) expressed by the NN of the parameters iv is denoted $r_\psi(c|x)$. For example, as a concrete form of $r_\psi(c|x)$, $\mu_\psi(x)$ and $\sigma^2_\psi(x)$ are treated as the output of the NN of the timbre feature extraction unit 22, and a Gaussian distribution having the above as the mean and the variance is defined in the following Expression (24).

[Math. 24]

$$r_\psi(c|x) = \mathcal{N}(c|\mu_\psi(x), \text{diag}(\sigma_\psi^2(x))) \quad \text{Expression (24)}$$

The right side of Expression (24) is the negative weighted square error between $c \sim q_{\varphi_{vis}}(c|y)$ and $\mu_\psi(x)$, and thereby increasing the right side of Expression (24) corresponds to causing the outputs of the appearance feature extraction unit 14 and the timbre feature extraction unit 22 to approach each other.

From the above, the following Expression (25) is a learning criterion to be increased together with Expression (15).

[Math. 25]

$$R(\theta_{aud}, \phi_{aud}, \phi_{vis}, \psi) = \mathbb{E}_{\tilde{x} \sim p_d(\tilde{x}), \tilde{y} \sim p_d(\tilde{y})} \quad \text{Expression (25)}$$

$$\left[\mathbb{E}_{z \sim q_{\phi_{aud}}(z|\tilde{x}), c \sim q_{\phi_{vid}}(c|\tilde{y})}\mathbb{E}_{x \sim p_{\theta_{aud}}(x|z,c)}[\log r_\psi(c|x)]\right]$$

Consequently, the following Expression (26) combining Expression (25) and Expression (15) is the learning criterion of the proposed method.

[Math. 26]

$$\mathbb{L}(\theta_{aud},\varphi_{aud},\theta_{vis},\varphi_{vis}) + \mathcal{R}(\theta_{aud},\varphi_{aud},\varphi_{vis},\psi) \qquad \text{Expression (26)}$$

At this point, one point that demands attention is the calculation of expected values with respect to $z \sim q_{\varphi_{aud}}(z|x)$, $c \sim q_{\varphi_{vis}}(c|y)$, and $x \sim p_{\theta_{aud}}(x|z, c)$ appearing in Expression (15) and Expression (25). The term $\log p_{\theta_{aud}}(x|z, c)$ is a nonlinear function of $z$ and $c$, the term $\log p_{\theta_{vis}}(y|c)$ is a nonlinear function of $c$, and the term $\log r_\psi(c|x)$ is a nonlinear function of $x$, and in general, obtaining expected values for these terms analytically is difficult. Consequently, a calculation method using a Monte Carlo approximation by sampling $z$, $c$, and $x$ according to the distribution of each is conceivable. However, in this case, the parameters $\varphi_{aud}$, $\varphi_{vis}$, and $\theta_{aud}$ are included in the source distribution to be sampled, and evaluating the gradient of each term with respect to $\varphi_{aud}$, $\varphi_{vis}$, and $\theta_{aud}$ cannot be evaluated in back-propagation.

Here, using the normal random number expressed in the following Expression (27) and the fact that Expressions (28) to (30) are equivalent expressions for $z \sim q_{\varphi_{aud}}(z|x)$, $c \sim q_{\varphi_{vis}}(c|y)$, and $x \sim p_{\theta_{aud}}(x|z, c)$, respectively, the expected value calculation described above can be replaced by a Monte Carlo approximation through a sampling of $\epsilon$ in actuality.

[Math. 27]

$$\epsilon \sim \mathcal{N}(\epsilon|0,I) \qquad \text{Expression (27)}$$

[Math. 28]

$$z = \mu_{\varphi_{aud}}(x) + \sigma_{\varphi_{aud}}(x) \odot \epsilon \qquad \text{Expression (28)}$$

[Math. 29]

$$c = \mu_{\varphi_{vis}}(y) + \sigma_{\varphi_{vis}}(y) \odot \epsilon \qquad \text{Expression (29)}$$

[Math. 30]

$$x = \mu_{\theta_{aud}}(z,c) + \sigma_{\theta_{aud}}(z,c) \odot \epsilon \qquad \text{Expression (30)}$$

In Expressions (28) to (30), the sign illustrated as a circle with a central dot denotes the element product of a vector. With this arrangement, the parameters $\varphi_{aud}$, $\varphi_{vis}$ and $\omega_{aud}$ can be shifted into $\log p_{\theta_{aud}}(x|z, c)$, $\log p_{\theta_{vis}}(y|c)$, and $\log r_\psi(c|x)$. As a result, it is possible to evaluate the gradient of each term with respect to the parameters $\varphi_{aud}$, $\varphi_{vis}$ and $\theta_{aud}$. This technique is called a variable transformation trick.

FIGS. 4 to 8 are diagrams illustrating examples of the architecture of each neural network (NN).

Figure 4:
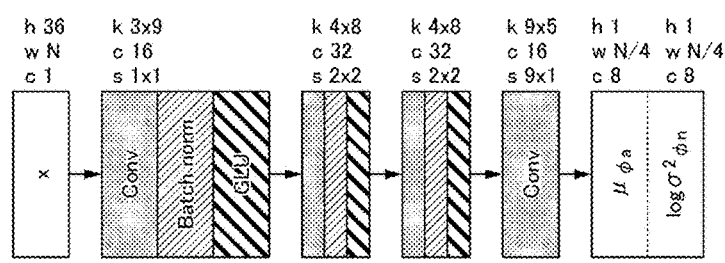
FIG. 4 is a diagram illustrating an example of the architecture of a linguistic information extraction unit according to the embodiment.
Figure 5:
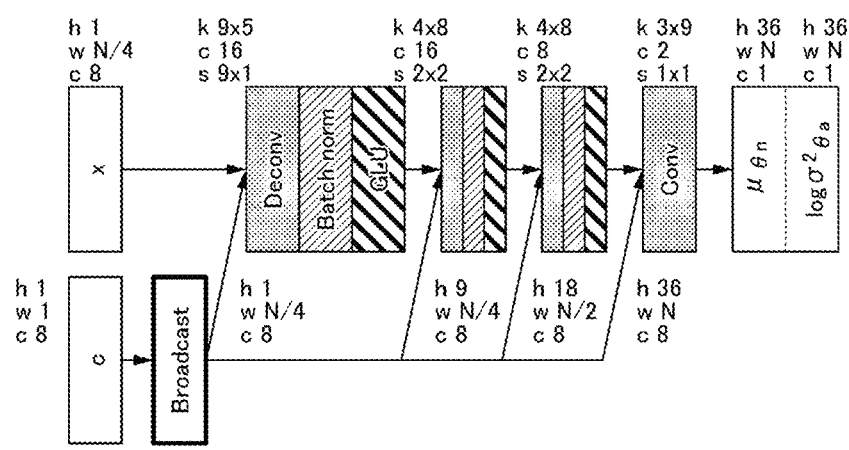
FIG. 5 is a diagram illustrating an example of the architecture of a converted voice generation unit according to the embodiment.
Figure 6:
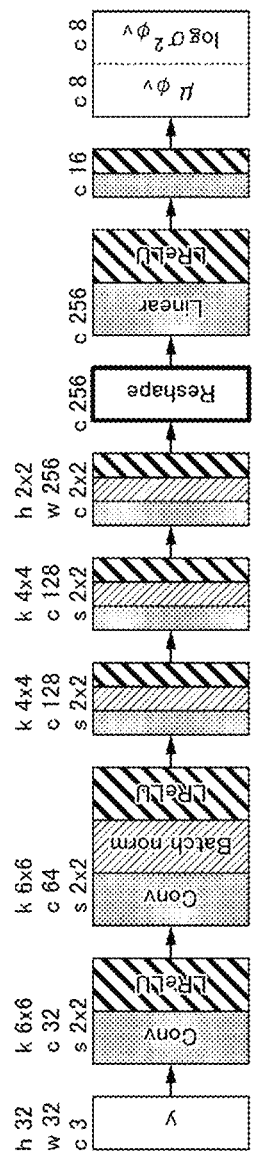
FIG. 6 is a diagram illustrating an example of the architecture of an appearance feature extraction unit according to the embodiment.
Figure 7:
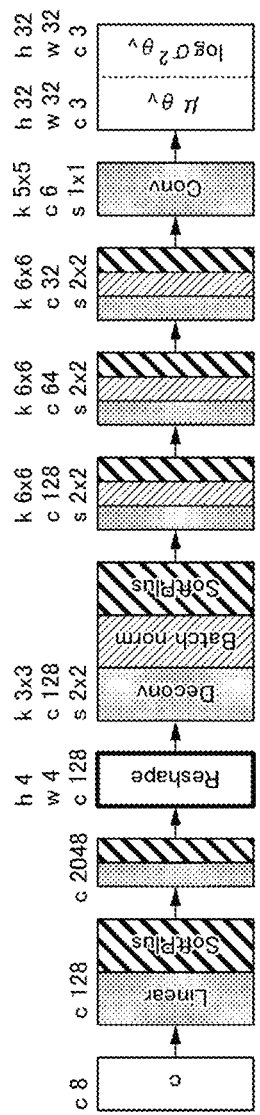
FIG. 7 is a diagram illustrating an example of the architecture of an image generation unit according to the embodiment.
Figure 8:
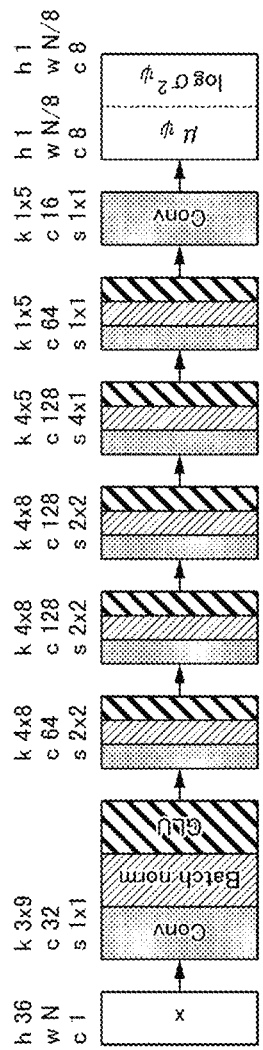
FIG. 8 is a diagram illustrating an example of the architecture of a timbre feature extraction unit according to the embodiment.

FIG. 4 is a diagram illustrating an example of the architecture of the linguistic information extraction unit 12 according to the embodiment. FIG. 5 is a diagram illustrating an example of the architecture of the converted voice generation unit 15 according to the embodiment. FIG. 6 is a diagram illustrating an example of the architecture of the appearance feature extraction unit 14 according to the embodiment. FIG. 7 is a diagram illustrating an example of the architecture of the image generation unit 23 according to the embodiment. FIG. 8 is a diagram illustrating an example of the architecture of the timbre feature extraction unit 22 according to the embodiment. In each diagram, a notation describing an image of height h, width w, and number of channels c is adopted as the input and output of each NN. The terms "Conv", "Deconv", and "Linear" illustrated in each diagram denote a convolutional layer, a convolutional layer, and a fully connected layer, respectively. Also, "Batch norm", "GLU", "LReLU", and "SoftPlus" denote a batch normalization layer, a gated linear unit (GLU) layer, a leaky rectified linear unit (leaky ReLU) layer, and a softplus layer, respectively. Also, "Broadcast" and "Reshape" denote an array broadcasting process and an array reshaping process. The letters "k", "c", and "s" denote the kernel size, output channel, and stride of a convolutional layer.

<Conversion Method (Method According to Embodiment of Present Invention)>

For the acoustic features, any of the following (A1) to (A5) may be used.
- (A1) Vector containing a logarithmic amplitude spectrum as elements
- (A2) Vector containing mel-frequency cepstral coefficients as elements
- (A3) Vector containing linear predictor coefficients as elements
- (A4) Vector containing partial correlation (PARCOR) coefficients as elements
- (A5) Vector containing line spectral pair (LSP) parameters as elements The above (A1) can be obtained by using time-frequency analysis such as the short-time Fourier transform (STFT) or wavelet transforms. The above (A2) can be obtained by using mel-frequency cepstral analysis. The above (A3) can be obtained by using linear prediction analysis. The above (A4) can be obtained by using PARCOR analysis. The above (A5) can be obtained by using LSP analysis. In addition, (A1) may also be a spectral envelope obtained by a method such as STRAIGHT analysis or WORLD analysis, and (A2) to (A5) may also be obtained through respective analyses of the spectral envelope. For example, the following (B1) to (B5) may also be used as the acoustic features.
- (B1) Vector containing logarithmic spectral envelope as elements
- (B2) Vector containing mel-frequency cepstral coefficients obtained from B1 as elements
- (B3) Vector containing linear predictor coefficients obtained from B1 as elements
- (B4) Vector containing PARCOR coefficients obtained from B1 as elements
- (B5) Vector containing LSP parameters obtained from B1 as elements After the learning of $\varphi$ and $\theta$ is completed, an acoustic feature series x of an input voice and an input face image y can be used to obtain an acoustic feature series of a converted voice according to the following Expression (31).

[Math. 31]

$$\hat{x} = \mu_{\varphi_{aud}}(\mu_{\varphi_{aud}}(x), \mu_{\varphi_{vis}}(y)) \qquad \text{Expression (31)}$$

The time-domain signal can be obtained by using an inverse transform of the time-frequency analysis (such as the inverse SIFT or inverse wavelet transforms) in the case of using (A1) as the acoustic feature vector, or by using a vocoder in the case of using (A2) to (A5) or (B1) to (B5). Also, the acoustic feature series x of the input voice can be used to generate a face image according to the following Expression (32).

[Math. 32]

$$\hat{y} = \mu_{\theta_{vis}}(\mu_\psi(x)) \qquad \text{Expression (32)}$$

Figure 9:
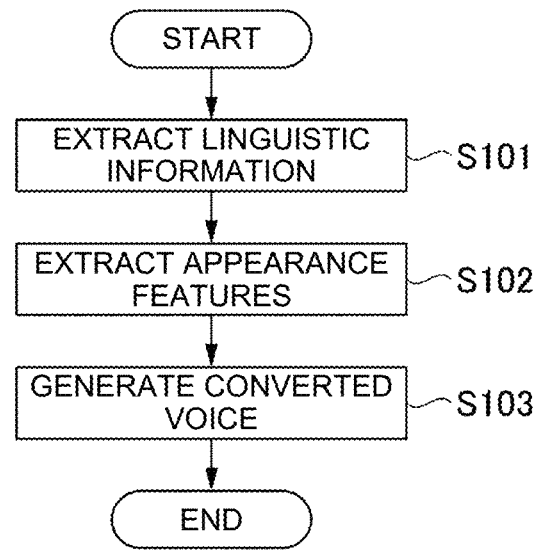
FIG. 9 is a flowchart illustrating the flow of a converted voice generation process by a voice conversion device according to the embodiment.

FIG. 9 is a flowchart illustrating the flow of a converted voice generation process by the voice conversion device 10 according to the embodiment.

The linguistic information extraction unit 12 extracts linguistic information corresponding to utterance content from the input conversion source voice signal (step S101). The linguistic information extraction unit 12 outputs the extracted linguistic information to the converted voice generation unit 15. The appearance feature extraction unit 14 extracts appearance features from the input face image (step S102). The appearance feature extraction unit 14 outputs the extracted appearance features to the converted voice generation unit 15. The converted voice generation unit 15 generates a converted voice on the basis of the linguistic information output from the linguistic information extraction unit 12 and the appearance features output from the appearance feature extraction unit 14 (step S103). The converted voice generation unit 15 outputs the generated converted voice to the image generation device 20.

Figure 10:
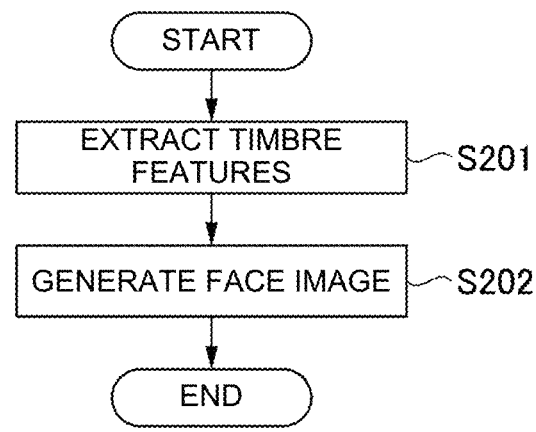
FIG. 10 is a flowchart illustrating the flow of a face image generation process by an image generation device according to the embodiment.

FIG. 10 is a flowchart illustrating the flow of a face image generation process by image generation device 20 according to the embodiment.

The timbre feature extraction unit 22 extracts timbre features expressing features related to vocal timbre from the input voice signal (step S201). The timbre feature extraction unit 22 outputs the extracted timbre features to the image generation unit 23. The image generation unit 23 generates a face image on the basis of the input timbre features and appearance features (step S202). The image generation unit 23 outputs the generated face image to an external device.

Figure 11:
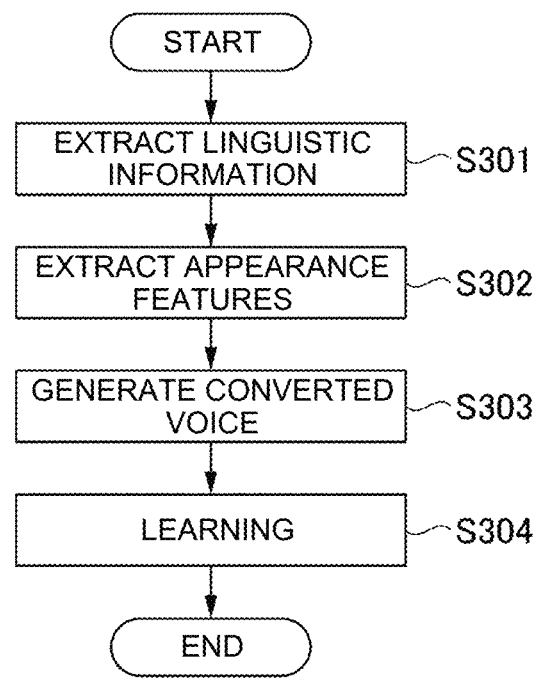
FIG. 11 is a flowchart illustrating the flow of a learning process by a voice conversion learning device according to the embodiment.

FIG. 11 is a flowchart illustrating the flow of a learning process by the voice conversion learning device 30 according to the embodiment.

The linguistic information extraction unit 32 extracts linguistic information corresponding to utterance content from the input conversion source voice signal (step S301). The linguistic information extraction unit 32 outputs the extracted linguistic information to the learning unit 36. The appearance feature extraction unit 34 extracts appearance features from the input face image (step S302). The appearance feature extraction unit 34 outputs the extracted appearance features to the learning unit 36. The converted voice generation unit 35 generates a converted voice on the basis of the input linguistic information and the appearance features (step S303). The converted voice generation unit 35 outputs the generated converted voice to the learning unit 36. On the basis of the input linguistic information, appearance features, and converted voice, the learning unit 36 trains and updates parameters of the linguistic information extraction unit 12, the appearance feature extraction unit 14, and the converted voice generation unit 15 of the voice conversion device 10 (step S304).

Figure 12:
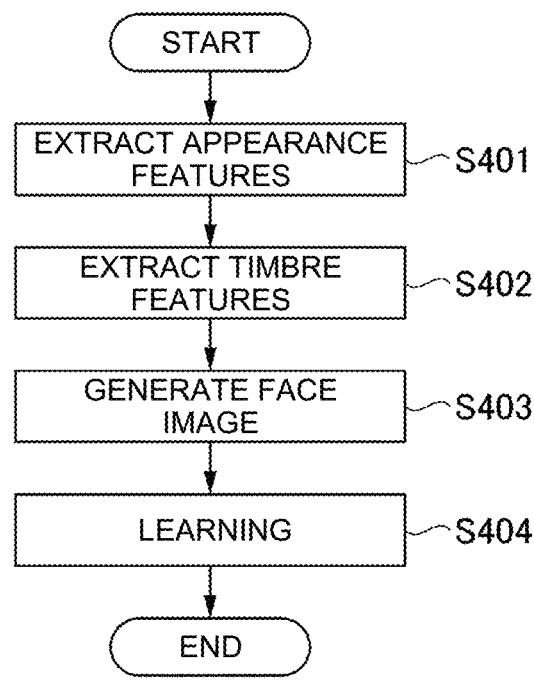
FIG. 12 is a flowchart illustrating the flow of a learning process by an image generation learning device according to the embodiment.

FIG. 12 is a flowchart illustrating the flow of a learning process by the image generation learning device 40 according to the embodiment.

The appearance feature extraction unit 42 extracts appearance features from the input face image (step S401). The appearance feature extraction unit 42 outputs the extracted appearance features to the image generation unit 45 and the learning unit 46. The timbre feature extraction unit 44 extracts timbre features expressing features related to vocal timbre from the input voice signal (step S402). The timbre feature extraction unit 44 outputs the extracted timbre features to the image generation unit 45 and the learning unit 46. The image generation unit 45 generates a face image on the basis of the input timbre features and appearance features (step S404). The image generation unit 45 outputs the generated face image to the learning unit 46. On the basis of the input appearance features and face image, the learning unit 46 trains and updates parameters of the image generation unit 23 of the image generation device 20 (step S404). Also, on the basis of the input timbre features and face image, the learning unit 46 updates parameters of the timbre feature extraction unit 22 of the image generation device 20.

According to the cross-modal processing system 100 configured as above, it is possible to achieve a novel cross-modal process using correlations between voices and faces. Specifically, the voice conversion device 10 accepts an input voice signal and face image as input, and converts the voice to a timbre conforming to the input face image. In this way, the voice conversion device 10 is capable of achieving a novel cross-modal process using correlations between voices and faces.

Also, the image generation device 20 accepts an input voice signal and appearance features obtained from a face image as input, and generates a face image conforming to the timbre of the input voice. In this way, the voice conversion device 10 is capable of achieving a novel cross-modal process using correlations between voices and faces.

Experimental Results

To confirm the conversion effect of the cross-modal timbre conversion according to the method of the present invention, virtual pair data of voices and face images were constructed using the voice data from the Voice Conversion Challenge 2018 (VCC 2018) and the face image data from the Large-scale CelebFaces Attributes (CelebA) dataset, and then subjectively evaluated. A learning dataset and a test dataset were created by a method of classifying each of the voice data and the face image data according to sex and age class (young, aged), and treating voice data and face image data randomly chosen from groups with the same attributes as virtual pair data. The sampling frequency of all voice signals was set to 22050 Hz, and each face image was downsampled to the size 32×32.

The spectral envelope, base frequency (F0), and aperiodicity were extracted from each utterance by WORLD analysis, and 35th-order mel-frequency cepstral analysis was performed on the extracted spectral envelope series. Both the learning and test datasets were normalized such that the mel-frequency cepstral series $x=[x_1, \ldots, x_N]=(x_{d,n})_{D \times N}$ of each utterance treated as the input has a mean of 0 and a variance of 1 in each dimension, as expressed by the following Expression (33).

[Math. 33]

$$x_{d,n} \leftarrow \frac{x_{d,n} - \alpha_d}{\beta_d} \qquad \text{Expression (33)}$$

In the above, $\alpha_d$ and $\beta_d$ represent the mean and the standard deviation of $x_{d,n}$ in each voiced segment. A network that predicts the logarithm $F_0 l_n$ in voiced segments as well as the mean and the variance in each dimension of the mel-frequency cepstrum $x_{d,n}$ from a face image was trained separately, and during testing, the logarithm $F_0$ and the mel-frequency cepstrum of the output voice was converted using the mean and the variance predicted by the network, as expressed in the following Expressions (34) and (35).

[Math. 34]

$$\hat{x}_{d,n} \leftarrow \frac{\hat{\beta}_d}{\beta_d}(x_{d,n} - \alpha_d) + \hat{\alpha}_d \qquad \text{Expression (34)}$$

[Math. 35]

$$\hat{l}_n \leftarrow \frac{\hat{v}}{v}(l_n - m) + \hat{m} \qquad \text{Expression (35)}$$

The terms m and v indicated in Expression (35) represent the mean and the standard deviation in voiced segments of the logarithm $F_0 l_n$. The terms $\hat{\alpha}_d$, $\hat{\beta}_d$, $\hat{m}$, and $\hat{v}$ indicated in Expressions (34) and (35) represent the mean and the standard deviation (in voiced segments) of the mel-frequency cepstrum and the logarithm $F_0$ predicted from the input image. As baseline methods for comparative experiment, (1) a method of simply converting the logarithm $F_0$ and the mel-frequency cepstrum of the input voice on the basis of the sex label and age class label such that the mean and the variance match the mean and the variance of the logarithm $F_0$ and the mel-frequency cepstrum of a voice having the same attributes in the learning data (Baseline 1), and (2) a method of performing voice conversion in stages with a CVAE treating a face attribute identifier that predicts the sex and age class from a face image, the sex, and the age class as attribute codes (Baseline 2) were implemented.

Figure 13:
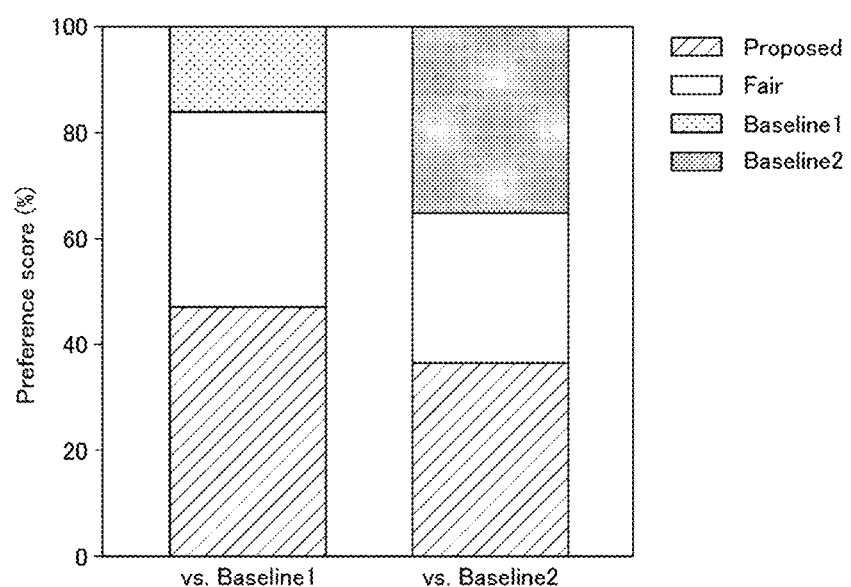
FIG. 13 is a diagram illustrating an experimental result according to the present invention.

To compare the effect of the voice conversion according to the proposed method between these baseline methods, a subjective evaluation was performed using an ABX test. In the ABX text, converted voices obtained by the proposed method and the baseline methods were treated as A and B, and the face image corresponding to the input voice was treated as X. Each listener chose whether the voice A or the voice B better fits the face image X, and then selected one from among A, B, and Fair (equivalent) for each utterance. As illustrated in FIG. 13, the experimental results confirmed the superiority of the proposed method with respect to Baseline 1, and confirmed that a conversion effect on a par with Baseline 2 was obtained. Unlike the proposed method, because both of the baseline methods use voice and face image attribute information, the proposed method is being compared under disadvantageous conditions in the present test, and therefore the above results are thought to indicate the effectiveness of the proposed method.

Figure 14:
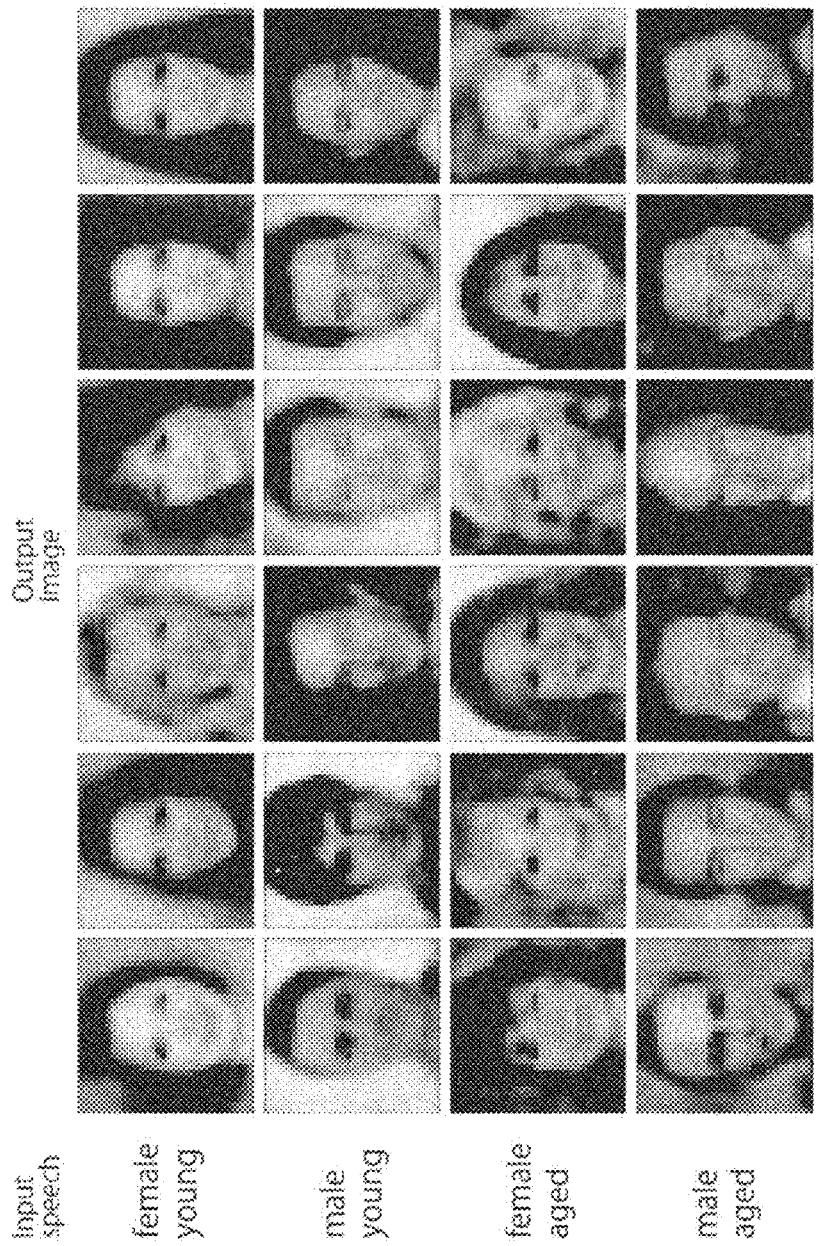
FIG. 14 is a diagram illustrating an experimental result according to the present invention.

In addition, an experiment of combining the timbre feature extraction unit 22 and the image generation unit 23 to generate a face image from an input voice was performed. As illustrated in FIG. 14, the experiment confirmed that face images conforming to the attributes of the input voices to some degree are generated successfully.

Modifications

The voice conversion device 10 and the voice conversion learning device 30 may also be configured as a single device. The image generation device 20 and the image generation learning device 40 may also be configured as a single device.

An embodiment of the present invention has been described in detail and with reference to the drawings, but the specific configuration is not limited to the above embodiment, and includes designs and the like within a scope that does not depart from the gist of the present invention.

REFERENCE SIGNS LIST

10 Voice conversion device
20 Image generation device
30 Voice conversion learning device
40 Image generation learning device
11 Voice input unit
12 Linguistic information extraction unit
13 Image input unit
14 Appearance feature extraction unit
15 Converted voice generation unit
21 Voice input unit
22 Timbre feature extraction unit
23 Image generation unit
31 Voice input unit
32 Linguistic information extraction unit
33 Image input unit
34 Appearance feature extraction unit
35 Learning unit
41 Image input unit
42 Appearance feature extraction unit
43 Image generation unit
44 Voice input unit
45 Timbre feature extraction unit
46 Learning unit

The invention claimed is:

1. A voice device comprising one or more processors configured to perform operations comprising:
   receiving a voice signal;
   extracting linguistic information corresponding to utterance content from the voice signal;
   receiving a captured image of a person;
   extracting appearance features expressing features related to the look of the person's face from the captured image;
   determining a target timbre conforming to the appearance features of the person in the captured image; and
   generating a converted voice based on the linguistic information and the appearance features, wherein the converted voice is in the target timbre that conforms to the appearance features of the person in the captured image.

2. The voice device according to claim 1, wherein the operations comprise:
   accepting linguistic information corresponding to the utterance content extracted from the voice signal and appearance features expressing features related to the look of the person's face extracted from the captured image of the person as input, and train parameters of a linguistic information extraction unit configured to extract the linguistic information, an appearance feature extraction unit configured to extract the appearance features, and a converted voice generation unit configured to generate the converted voice on a basis of the linguistic information and the appearance features.

3. The voice device according to claim 2, wherein the operations comprise:
   performing learning such that the converted voice obtained when the linguistic information and the appearance features are input is as close as possible to the voice signal from which the linguistic information is extracted.

4. A non-transitory computer readable medium storing one or more instructions causing a computer to function as the voice device according to claim 1.

5. An image device comprising:
   a timbre feature extraction unit, including one or more processors, configured to extract timbre features expressing features related to vocal timbre from a voice signal; and an image generation unit, including one or more processors, configured to generate a face image on a basis of the timbre features and appearance features expressing features related to the look of a person's face obtained from a captured image of the person, wherein the generated face image conforms to the timbre features of the voice signal.

6. The image device according to claim 5, comprising:
a learning unit, including one or more processors, configured to accept timbre features expressing features related to vocal timbre extracted from the voice signal, appearance features expressing features related to the look of a person's face obtained from the captured image of the person, and a captured image of a person as input, and train parameters of the timbre feature extraction unit configured to extract the timbre features.

7. The image device according to claim 6, wherein the learning unit is configured to perform learning on a basis of the appearance features and the captured image such that the face image generated when the appearance features from any given captured image are input is as close as possible to the captured image from which the appearance features are extracted.

8. The image device according to claim 6, wherein the learning unit is configured to perform learning on a basis of the timbre features and the captured image such that the timbre features are as close as possible to appearance features obtained from the captured image used to generate a face image.

9. A method comprising:
receiving a voice signal;
extracting linguistic information corresponding to utterance content from the voice signal;
receiving a captured image of a person;
extracting appearance features expressing features related to the look of the person's face from the captured image of the person;
determining a target timbre conforming to the appearance features of the person in the captured image; and
generating a converted voice based on the linguistic information and the appearance features, wherein the converted voice is in the target timbre that conforms to the appearance features of the person in the captured image.

10. The method according to claim 9, comprising:
performing learning that accepts the linguistic information corresponding to utterance content extracted from the voice signal and appearance features expressing features related to the look of a person's face extracted from the captured image of the person as input, and training parameters of a linguistic information extraction unit that extracts the linguistic information, an appearance feature extraction unit that extracts the appearance features, and a converted voice generation unit that generates a converted voice on a basis of the linguistic information and the appearance features.

11. The method according to claim 9, comprising:
extracting timbre features expressing features related to vocal timbre from a voice signal; and
generating a face image on a basis of the timbre features and appearance features expressing features related to the look of the person's face obtained from the captured image of the person.

12. The method according to claim 9, comprising:
performing learning that accepts timbre features expressing features related to vocal timbre extracted from a voice signal, appearance features expressing features related to the look of a person's face obtained from the captured image of the person, and the captured image of a person as input, and training parameters of an image generation unit that generates a face image on a basis of the timbre features and the appearance features and a timbre feature extraction unit that extracts the timbre features.

13. The method according to claim 10, comprising:
performing learning such that the converted voice obtained when the linguistic information and the appearance features are input is as close as possible to the voice signal from which the linguistic information is extracted.

* * * * *